(12) United States Patent
Rosenberg et al.

(10) Patent No.: US 10,362,764 B2
(45) Date of Patent: Jul. 30, 2019

(54) CAT AMUSEMENT SYSTEM

(71) Applicant: Worldwise, Inc.

(72) Inventors: Hannah Rosenberg, San Francisco, CA (US); Aimee Diskin, Napa, CA (US); Charles Floyd, Oakland, CA (US); Victoria Davila, San Francisco, CA (US); Michael Risso, Napa, CA (US); Lisa Davis-David, Fairfax, CA (US); Andrew Murrer, Alamo, CA (US); Erwin Del Pinal, El Cerrito, CA (US)

(73) Assignee: Worldwise, Inc., Novato, CA (US)

( * ) Notice: Subject to any disclaimer, the term of this patent is extended or adjusted under 35 U.S.C. 154(b) by 611 days.

(21) Appl. No.: 15/075,494

(22) Filed: Mar. 21, 2016

(65) Prior Publication Data

US 2017/0265436 A1   Sep. 21, 2017

(51) Int. Cl.
*A01K 15/02* (2006.01)

(52) U.S. Cl.
CPC .................. *A01K 15/025* (2013.01)

(58) Field of Classification Search
CPC .... A01K 15/025; A01K 15/02; A01K 15/026; A01K 15/027; A63H 30/04
USPC ........ 119/707, 706, 708, 711; 446/456, 175, 446/409, 437, 454
See application file for complete search history.

(56) References Cited

U.S. PATENT DOCUMENTS

| | | | | |
|---|---|---|---|---|
| 4,231,077 A * | 10/1980 | Joyce | ..................... | A63H 33/22 362/109 |
| 4,391,224 A * | 7/1983 | Adler | ..................... | A63H 30/04 119/707 |
| 5,195,920 A * | 3/1993 | Collier | ................... | A63H 17/34 446/175 |
| 5,334,075 A * | 8/1994 | Kakizaki | ................ | A63H 17/36 446/437 |
| 5,524,326 A * | 6/1996 | Markowitz | .......... | A01K 15/025 119/482 |
| 5,657,721 A * | 8/1997 | Mayfield | .............. | A01K 15/025 119/707 |
| 5,823,844 A * | 10/1998 | Markowitz | .......... | A01K 15/025 446/175 |
| 6,039,628 A * | 3/2000 | Kusmiss | .............. | A01K 15/025 446/290 |
| 6,651,591 B1 * | 11/2003 | Chelen | ................. | A01K 15/025 119/707 |
| 6,684,819 B1 * | 2/2004 | Locke | .................. | A01K 15/025 119/707 |
| 6,701,872 B1 * | 3/2004 | Allen | ................... | A01K 15/025 119/707 |
| 7,066,780 B2 * | 6/2006 | Jamison | ................ | A01K 15/02 119/707 |
| 7,104,222 B2 * | 9/2006 | Tsengas | ............... | A01K 15/025 119/711 |

(Continued)

*Primary Examiner* — Yvonne R Abbott-Lewis
(74) *Attorney, Agent, or Firm* — Bay Area Technology Law Group PC

(57) ABSTRACT

A cat amusement system including a user actuated transmitter sized to be held by hand, the transmitter housing an actuation signal generator for remotely controlling a pet activity toy The system also includes a user actuated light generator for generating light at a wavelength and intensity to be visible to a pet proximate the pet activity toy The pet activity toy includes a motor which propels the pet activity toy upon receipt of the actuation signal emanating from said transmitter.

6 Claims, 1 Drawing Sheet

(56) References Cited

U.S. PATENT DOCUMENTS

| | | | | |
|---|---|---|---|---|
| 7,347,761 | B2* | 3/2008 | Rowe | A01K 15/026 |
| | | | | 446/279 |
| 7,621,235 | B2* | 11/2009 | Genitrini | A01K 15/025 |
| | | | | 119/706 |
| D621,103 | S * | 8/2010 | Kim | D30/160 |
| 8,347,823 | B1* | 1/2013 | Thomas | A01K 15/025 |
| | | | | 119/707 |
| 9,491,930 | B2* | 11/2016 | Cook | A01K 15/025 |
| 9,565,835 | B1* | 2/2017 | Nobile | A01K 15/025 |
| 10,034,459 | B1* | 7/2018 | Scanlan | A01K 15/025 |
| 2004/0082268 | A1* | 4/2004 | Choi | A63H 17/004 |
| | | | | 446/454 |
| 2008/0011243 | A1* | 1/2008 | Moulton | A01K 15/021 |
| | | | | 119/707 |
| 2012/0097114 | A1* | 4/2012 | Scott | A01K 15/025 |
| | | | | 119/707 |
| 2013/0278398 | A1* | 10/2013 | Smetanin | A63H 30/04 |
| | | | | 340/12.52 |
| 2015/0093961 | A1* | 4/2015 | vom Scheidt, Jr. | A63H 17/00 |
| | | | | 446/454 |
| 2015/0237828 | A1* | 8/2015 | Peavey | A01K 15/025 |
| | | | | 119/707 |

* cited by examiner

CAT AMUSEMENT SYSTEM

TECHNICAL FIELD

The present invention is directed to a pet activity system specifically intended to be of interest to domestic cats The system includes a handheld controller capable of remotely actuating a toy and emitting a visible light signal which, in combination, cats find to be irresistible as a result of their curiosity and prey instinct

BACKGROUND OF THE INVENTION

It is well known that pets, and particularly cats, have certain instinctual needs which must be satisfied. Failure to do so can not only result in the expression of overt antisocial behavior but can even adversely affect the health and well-being of the animal One of these needs is to chase a moving attractant and, in the vicinity of the attractant, to swipe and pounce upon it satisfying the cat's inherent need to hunt A cat's instinct to swipe and pounce upon a moving object is well known to virtually all cat owners It is quite common to see a pet owner dangle an attractant such as a feathered bundle or plush mouse in a cat's vicinity to appreciate this instinctual behavior. Such toys also help to keep cats occupied and exercised while providing the pet's owner with the enjoyment of watching his or her cat at play.

Although there are a plethora of cat toys which have been designed to satisfy the cat's need to hunt, most are either overly complex, fail to achieve their intended objective, are subject to breakage or fail to maintain the cat's interest over time It is thus an object of the present invention to provide a pet activity system which includes a powered pet toy thus stimulating the cat's need to hunt and pounce It is yet a further object of the present invention to provide a pet activity system which includes, in combination, a light source and powered toy to further encourage a cat to swipe and pounce as a form of amusement These and further objects will be more readily apparent when considering the following disclosure and appended claims.

SUMMARY OF THE INVENTION

A cat amusement system comprising a user actuated transmitter sized to be held by hand, said transmitter comprising an actuation signal generator for remotely controlling a pet activity toy;
a user actuated light generator for generating light at a wavelength and intensity to be visible to a pet proximate the pet activity toy; and
a pet activity toy comprising a motor, power source for powering said motor, a receiver for receiving said actuation signal, an actuator for controlling said motor and means for propelling said pet activity toy coupled to said motor upon receipt of said actuation signal emanating from said transmitter

DETAILED DESCRIPTION OF THE INVENTION

Figure 1:
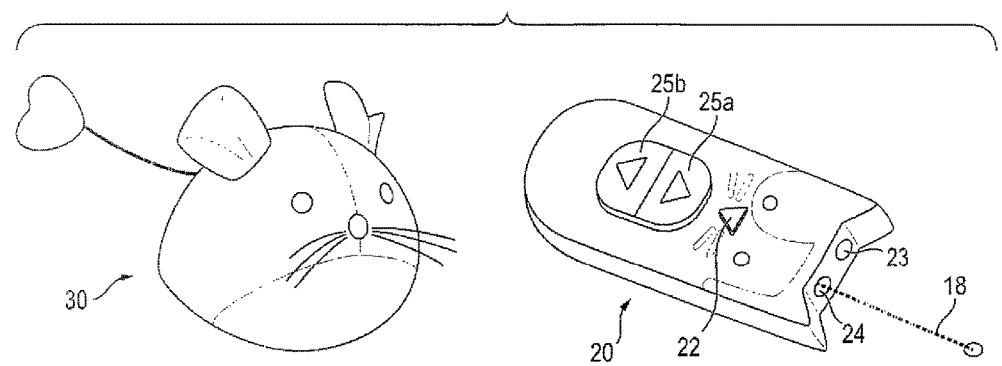
FIG. 1 is a perspective view of the cat amusement system of the present invention

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated There are, of course, additional features of the invention that will be described hereinafter and which will form additional subject matter of the claims appended hereto Those skilled in the art will appreciate that the conception upon which this disclosure is based readily may be utilized as a basis for the designing of other structures, methods and systems for carrying out the several purposes of the present invention It is important therefore, that claims be regarded as including such equivalent constructions insofar as they do not depart from the spirit and scope of the present invention Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Figure 2:
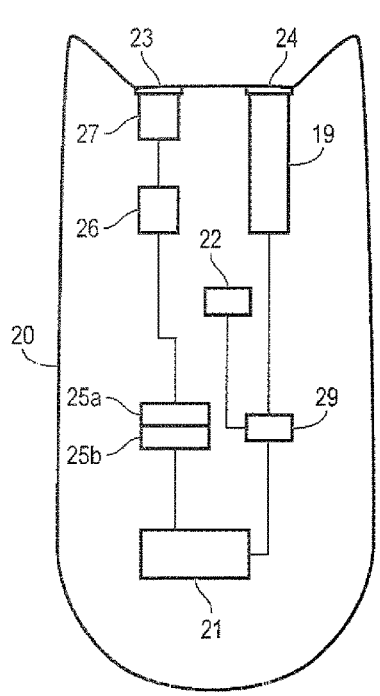
FIG. 2 is a plan view of the transmitter of the present invention illustrating its operational components

The cat amusement system of the present invention is, basically, a two-part system comprised of transmitter 20 and pet activity toy 30. In combination and in taking advantage of all of the capabilities of this combination, a cat can be amused for extended periods of time devoid of boredom while honing the cat's hunting and pouncing instincts Thus, the present system in synergistically combining a light source with a remotely activated toy stimulates interest to a level not possible when only individual components are made available separately The transmitter portion of this invention is depicted in FIGS. 1 and 2. Transmitter 20 is sized to be handheld by the pet owner and, externally, provides button actuator 22 and signal actuator 25a/25b. Transmitter 20 includes a power source 21 such as a replaceable battery which is used to activate its working components, the first of which is light generator 19. In operation, a user will depress button actuator 22 which activates switch 29 selectively powering light generator 19 which emits light through opening 24 at a wavelength and intensity to be visible to a pet cat proximate pet activity toy 30. Ideally, light generator 19 is in the form of a laser module which generates a suitable collimated light beam 18 through opening 24 of an intensity to be visible to a pet cat but which is not so intense as to injure the cat if, for example, the collimated light beam was to be shown directly into the eye of the cat.

Figure 3:
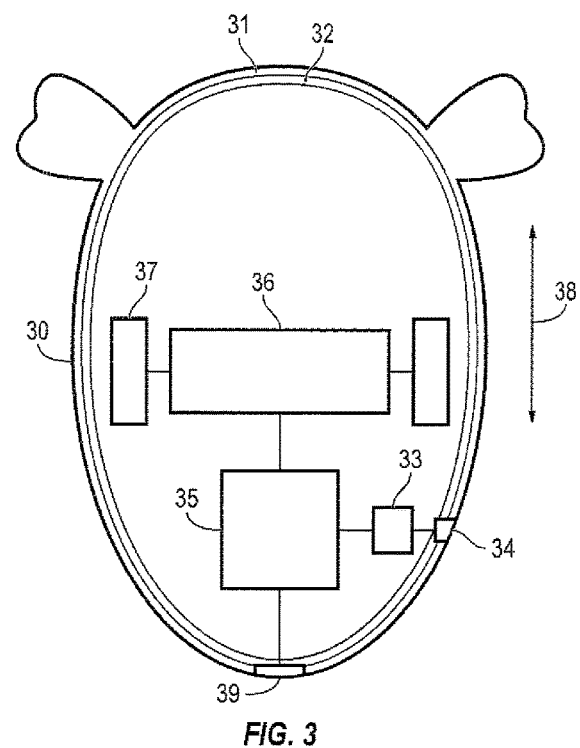
FIG. 3 is a plan view of the pet activity toy of the present invention illustrating its operational components

Transmitter 20 also includes code generator 26 for moving toy 30. Generator 26 is used in combination with LED 27 for selectively delivering an actuation signal through opening 23. In operation, signal actuator 25a/25b is in the form of a switch which is again powered by source 21. In doing so, alternative signals are provided to code generator 26 which causes LED 27 to send signals to receiver 39 (FIG. 3) which in turn are delivered to actuator 35 and then on to motor 36. Ideally, the actuation signals are in the form of transmissions such as which are coded such that when a pet owner depresses switch 25a, motor 36 is powered in a first direction causing wheels 37 to turn counterclockwise causing pet activity toy 30 to move forward and when the user depresses switch 25b, the appropriate infrared signal is received by infrared receiver 39 causing actuator 35 to direct motor 36 to turn in the opposite direction causing wheels 37 to move clockwise resulting in pet activity toy 30 to move backwards.

Pet activity toy 30 is comprised of plastic shell 32 housing its internal components and covered by plush fabric 31. In this instance, pet activity toy 30 is shown in the form of a mouse although the present invention can be fabricated with pet activity toy 30 replicating any shape that the pet owner would find amusing for interaction with his or her cat.

As noted previously, pet activity toy 30 includes infrared receiver 39 operationally connected to actuator 35 which is in turn employed to control motor 36 and ultimately wheels 37. Pet activity toy 30 can include power source 33 which could be in the form of a battery which is replaceable or rechargeable, in this instance, rechargeable by virtue of USB port 34.

In operation, a pet owner could begin to engage his or her cat by either generating a light beam in the vicinity of the cat to get its attention or, alternatively, cause pet activity toy 30 to move forwards or backwards in the direction of arrows 38. Once the pet owner has gotten the cat's attention, the cat's innate instinct to hunting and pounce is honed by alternating between the appropriate light source and toy movement. It was found that a cat will pounce upon pet activity toy 30 preventing it from moving. The pet owner could then attract a cat's attention by the appropriate light source causing the cat to drop the toy and swat at the light source and even jump upon it whereupon the pet owner could then move pet activity toy 30 causing the cat to lose interest in the light source turning its attention to the moving rodent. Not only does this combination synergistically entertain a cat but can cause the cat to drop the toy in favor of the light source to enable the toy to once again move by virtue of its wheels contacting a floor or suitable support surface. Stated differently, if the toy alone was used in this environment, the cat could become bored for once the toy is picked up or tipped over by swatting, it will not move as its wheels will not remain in contact with it support surface. A cat will lose interest in the inanimate toy and simply leave it to pursue more interesting activities. No other toy is capable of engaging a cat to this degree of involvement.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A cat amusement system comprising:
a user actuated transmitter sized to be held by hand, said transmitter comprising (1) an actuation signal generator for remotely controlling a pet activity toy and (2) a user actuated light generator for generating light at a wavelength and intensity to be visible to a pet proximate said pet activity toy; and
a pet toy comprising (1) a motor, (2) power source for powering said motor, (3) a receiver for receiving said actuation signal, and (4) an actuator for controlling said motor propelling said pet activity toy upon receipt of said actuation signal emanating from said transmitter,
said actuation signal generator and said user actuated light generator being operable independently of one another for attracting a pet cat to stimulate its hunt and pounce instincts.

2. The cat amusement system of claim 1 wherein said user actuated transmitter selectively transmits infrared signals and said pet activity toy receives said infrared signals for selectively actuating said motor.

3. The cat amusement system of claim 1 wherein said means for propelling said pet activity toy comprises wheels coupled to said motor.

4. The cat amusement system of claim 3 wherein said motor is selectively actuated such that said wheels are caused to move in clockwise and counterclockwise directions for propelling said pet toy forward and backwards.

5. The cat amusement system of claim 1 wherein said user actuated light generator comprises a laser.

6. The cat amusement system of claim 1 wherein said user actuated light generator does not control said pet toy.

* * * * *